United States Patent [19]

Ongaro

[11] 3,942,237
[45] Mar. 9, 1976

[54] PRODUCTION OF TRIDIMENSIONAL INDICATIVE AND/OR DECORATIVE PIECES

[76] Inventor: Giovanni Ongaro, 4, Via Castelmorrone, Milan, Italy

[22] Filed: Feb. 24, 1975

[21] Appl. No.: 552,309

Related U.S. Application Data

[63] Continuation of Ser. No. 299,424, Oct. 11, 1972, abandoned.

[30] Foreign Application Priority Data

Oct. 20, 1971 Italy .................................. 30084/71

[52] U.S. Cl. .................... 29/417; 40/125 E; 83/42; 264/148; 264/157; 264/177 R
[51] Int. Cl.² ........................................ B23P 17/00
[58] Field of Search ...... 29/417, 412, 177, DIG. 47; 428/542; 40/125 E, 125 R; 35/71; 83/42, 13, 925 R; 425/308, 309, 310; 264/177 R, 148–151, 157–159

[56] References Cited
UNITED STATES PATENTS

| | | |
|---|---|---|
| 2,296,842 | 9/1942 | Garvey et al. .................. 264/148 |
| 2,309,666 | 2/1943 | Parker .......................... 29/417 UX |
| 2,717,420 | 9/1955 | Roy ............................... 425/308 X |
| 3,481,455 | 12/1969 | Graham et al. ............... 264/148 X |
| 3,490,135 | 1/1970 | Stein ............................ 29/417 |

*Primary Examiner*—Victor A. Di Palma
*Attorney, Agent, or Firm*—Toren, McGeady and Stanger

[57] ABSTRACT

A method for producing indicative and/or decorative tridimensional pieces, e.g. types, digits or the like, comprising providing a beam having a normal cross-section reproducing the outline of said piece, and cutting said beam along a least two parallely spaced planes, in order to obtain single pieces having a desired thickness. The beam is preferably a drawn metallic or extruded plastic beam and the cutting operation thereof may be carried-out along planes forming a suitably selected angle, different than 90°, with the beam axis, to obtain single pieces having modified size ratios in respect to the beam normal cross-section.

9 Claims, 9 Drawing Figures

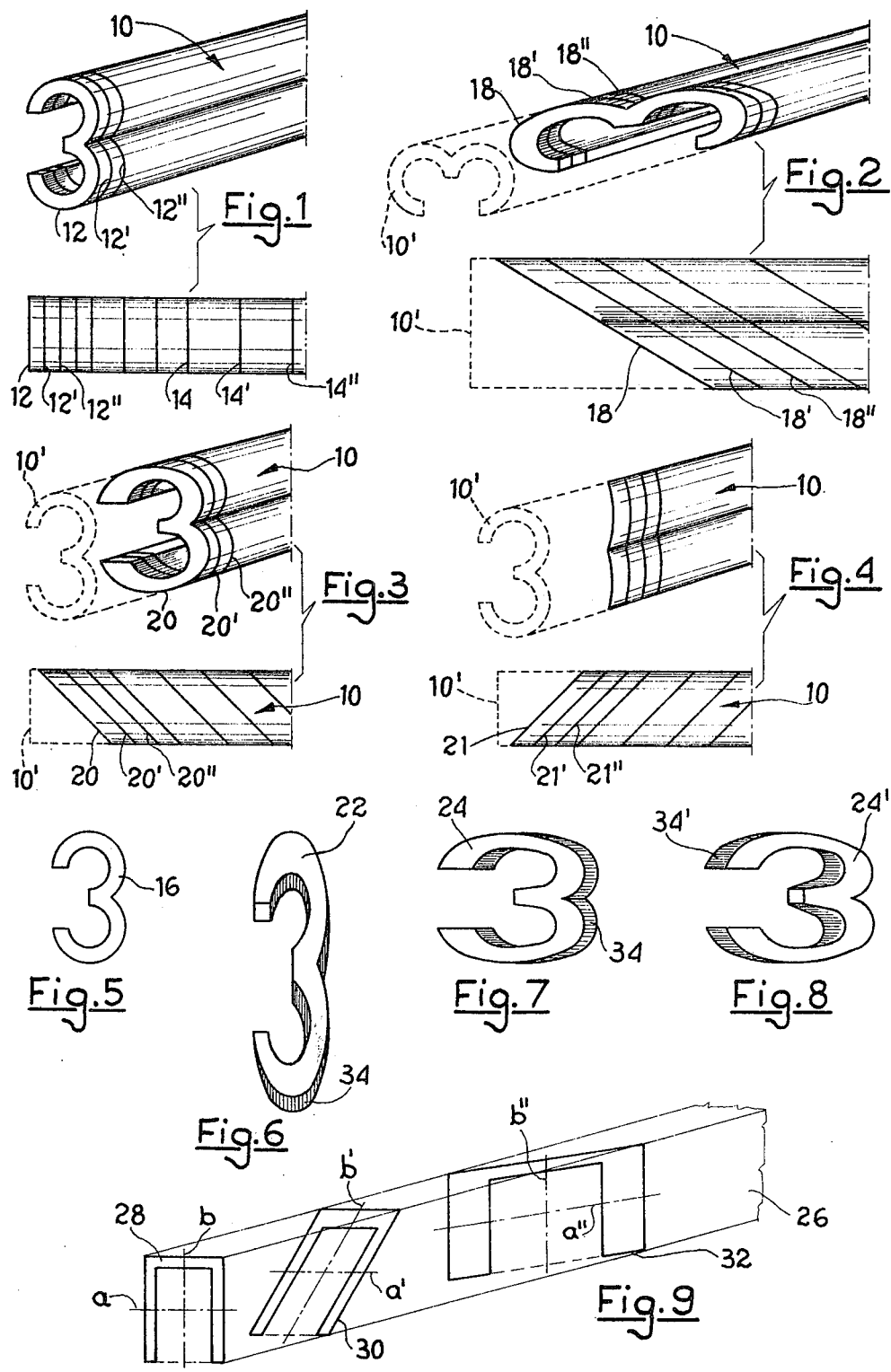

PRODUCTION OF TRIDIMENSIONAL INDICATIVE AND/OR DECORATIVE PIECES

This is a continuation of application Ser. No. 299,424, filed Oct. 11, 1972, now abandoned.

BACKGROUND

This invention concerns a novel and improved method for commercially producing tridimensional indicative and/or decorative pieces, preferably but not necessarily in a metallic material, as e.g., types, digits or the like to be affixed onto sign-boards, placards and the like, said method allowing a unusually simple and unexpensive production of said pieces, in particular from a rather small number of differently shaped semi-finished products each of which can be machined in such a manner as to obtain therefrom a plurality of said indicative and/or decorative pieces having a substantially common shape, but which can differ from each other at least in one of their sizes.

Referring particularly to types and digits adapted to be affixed onto sign-boards, placards and the like, two methods are actually known for obtaining said pieces, i.e. a casting method and a plate-shearing method. The casting method allows to obtain good quality but obviously expensive, indicative pieces, and the production of different series of types and digits having different sizes and thicknesses requires new molds for each dimensional change. The plate-shearing method is obviously less expensive, but poor quality pieces are thereby obtained and moreover the production equipments must be at least partially replaced at each product dimensional change, except when very small changes in the sheet or plate thickness are required.

SUMMARY

An object of this invention is to provide a method for commercially producing indicative and/or decorative pieces of the type and for the uses as above stated, by which said pieces can be easily and unexpensively obtained.

Said object can be attained by a method comprising the steps of providing a beam having a cross-sectional shape that reproduces the shape of a required indicative and/or decorative piece, and of cutting said beam along two or more parallel and spaced planes for producing one or more indicative and/or decorative pieces having a thickness corresponding to the interval between said planes. The production and cutting of e.g. aluminum drawn beams or of extruded plastics beams are less expensive than already known methods for the production of said indicative or decorative pieces. Further, according to another object of this invention, said method allows to change at will the thickness of produced pieces, easily and without additional or different equipments, by merely varying the interval between said beam cutting planes.

Therefore, pieces having an required thickness can be obtained and said thickness can be changed at will to comply with different customer requirements without any tool modification, as it is on the contrary required by heretofore known procedures, but merely changing, in a simple and quick way, the interval between said beam cutting planes.

However, a further object, that is very important from the viewpoint of a commercial production of said indicative and/or decorative pieces, can be attained by this invention. It is obvious that, in a commercial production of such said pieces, for each piece basic shape- e.g. for each types or digit—a selection between different piece sizes, e.g. different piece heights or widths must be offered to customers whereby a plurality of piece sets, e.g. a plurality of alphabets differing from one another for at least one size of their pieces, should be provided.

Now, a further object of this invention is to provide a piece production method whereby pieces having a common overall shape or indicative character but different sizes and dimensional ratios, i.e. pieces corresponding in different sets, can be obtained from a single type of semi-finished product or beam showing said common overall shape.

Said object can be attained by cutting said shaped beam along parallel planes forming an angle different from 90° with the beam longitudinal axis, the slanting value and orientation of said cutting planes being selected in such a manner as to obtain required size changes along required directions, with reference to the beam normal cross-section. Thus, from a single type of semi-finished product and consequently with a single die plate and from a single drawn or extruded beam, can be obtained a practically unlimited number of indicative and/or decorative pieces, having the same overall shape but differing from one another in their thickness and/or outline, as obtained by increasing at least one size of the beam normal cross-section.

Said dimensional increase in respect of the beam normal cross-section can be obtained by directing said parallel cutting planes in such a way that they are parallel to a line of the beam normal cross-section along which no piece size changes are required, whilst perpendicularly to said direction the obtained pieces show their maximum size change, with reference to the beam normal cross-section, and the amount of said size change can be established at will by suitably selecting the inclination of said parallel cutting planes in respect of beam main axis. It has been surprisingly ascertained that indicative and/or decorative pieces widely different from one another and showing remarkable increases in one of their sizes, can be obtained by said method, still maintaining their overall shape and their indicative and/or decorative features.

As previously stated, this invention also concerns indicative and/or decorative pieces, e/g. digits or alphabet types, as obtained by carrying-out the previously disclosed method said pieces being characterized in that they are made by a length of a beam, cut along two parallely spaced planes. Such parallel planes may be perpendicular to the beam outer surface between them, or may be inclined by an angle different than 90°, with respect to said surface in at least one sectional plane perpendicular to said cutting planes, when a size increase over the beam normal cross-section is required.

In this latter case, said beam surface extends, in at least one direction on said cutting planes, beyond the piece normal projection, i.e. it is visible in a plan view of said piece and causes a remarkable perspective effect, which can be established by selecting the side wherefrom said surface extends along said direction, by means of an adjustment of the cutting planes — always with the same inclination with respect to the beam axis — in such a manner that said inclination be positive or negative, respectively.

DRAWINGS

FIGS. 1 to 4 are persepctive views and top views of symbols or indicative and/or decorative pieces, different from one another, that can be obtained from a single starting beam.

FIGS. 5 to 8 are plan views of symbols or indicative and/or decorative pieces as obtained by the procedures as shown in FIGS. 1 to 4, respectively.

FIG. 9 diagrammatically shows how said differently sized symbols or pieces can be obtained from a single starting semi-finished product.

The commercial production of an indicative piece or symbol, namely the digit "3", is shown as an example in FIGS. 1 to 8, but obviously the same procedure can be followed for producing any other digit or alphabet type, and/or decorative piece, and therefore all references to said digit "3" in the following description are not to be understood as limitative.

As shown in FIG. 1, for producing indicative and/or decorative pieces according to this invention, a semi-finished product in the form of a drawn or extruded beam 10 or the like is provided, said beam having a cross-sectional outline similar to that of required indicative and/or decorative piece to be produced — in the considered example: the digit "3". Said semi-finished product is preferably obtained by drawing a metallic material e.g. aluminum, or by extruding a suitable plastics.

For the production of said pieces, said drawn or extruded beam 10 is cut along parallel planes 12, 12', 12" ... that can be perpendicular to the beam axis as shown in FIG. 1. Thus, the required symbols or pieces can be obtained in a remarkably simple and unexpensive way. As it can be readily appreciated, the interval between said parallel cutting planes can be changed at will, in order to obtain pieces having a required thickness, e.g. by carrying-out differently spaced cuts as shown by 14, 14', 14" ... The thus obtained pieces show in a plan view an outline 16 as in FIG. 5, i.e. equal to that of beam normal cross section, whilst, their thickness can be established at will and without any limit, on the basis of customer requirements.

However, indicative pieces or symbols having different sizes and dimensional ratios may be and usually are required. Such requirements are met, according to this invention, by utilizing the same drawn or extruded beam 10 without use of different dieplate or tooling. Such results can be obtained by cutting the beam 10 along parallel planes that are inclined on the beam axis by an angle different than 90°. Thus, an indicative piece, or symbol can be obtained wherein the original sizes of beam normal cross-section are increased at will in one direction and the outline and sizes of the piece are wholly modified, while maintaining its overall shape and distinctive or indicative power. Thus, when a beam 10, having a normal cross-section 10' equal to that shown in FIG. 1, is cut along parallel planes, 18, 18', 18" ... inclined on the longitudinal main axis of said beam normal section 10' as shown in FIG. 2, a digit "3" as shown by 22 in FIG. 6 is obtained, such digit having a height much greater than that of FIG. 5 and dimensional ratios which depend on the inclination value of said cutting planes 18, 18', 18" ... Conversely, when the same beam 10, having the same normal cross-section 10', is cut along parallel planes 20, 20', 20" ... inclined on the minor axis of said beam normal cross-section 10' (see FIG. 3), a digit "3" is obtained as indicated by 24 in FIG. 7, having a width much larger than that of the digit of FIG. 5. Even in this case, the dimensional ratios can be selected at will by adjusting the inclination of cutting planes. Obviously, size increases in any direction can be obtained by suitably positioning the cutting planes, that can be differently spaced to define the thickness of obtained symbols.

The oblique cutting of drawn or extruded beams should be carried-out as diagrammatically shown in FIG. 9, with reference to a beam 26 having a normal square cross-section and axes $a$ and $b$ of the same length. When said beam 26 is cut along planes perpendicular to the axis thereof, square shaped pieces are obviously obtained, whilst when the beam is cut along an inclined plane parallel to axis $a$, as indicated by 30, a rectangular, elongated section is obtained, having an axis $a'$ equal to axis $a$ and an axis $b'$ greater than axis $b$, by an amount that depends on the inclination of cutting plane 30. Conversely, by cutting the same beam 26 along an inclined plane 32 which is parallel to axis $b$, a rectangular section is still obtained, but extending in a direction orthogonal to the first one, with an axis $b''$ equal to axis $b$, and an axis $a''$ greater than axis $a$. Therefore, the beam cutting planes must be located parallely to the direction in the beam normal cross-section wherein no dimensional changes are required, while the greatest dimensional change is attained — again with reference to the beam normal cross-section — perpendicularly to said first direction, and in all other directions dimensional changes ranging from the maximum one down to zero are obtained.

As it can be appreciated from the digits 22 and 24 in FIGS. 6 and 7, when the drawn or extruded beam is obliquely cut the obtained pieces show a portion of outer beam surface, as indicated by 34 in said figures, that extends beyond the normal projection of said pieces in the direction of the greatest dimensional increase, and results in a given perspective effect. The piece side wherefrom said beam outer surface extends can be selected at will in order to obtain a required perspective effect, by choosing respectively a positive or negative inclination of cutting planes, relative to the beam axis. Thus e.g. the beam 10 of FIG. 4 is cut along planes 21, 21', 21" ... that are inclined, relative to beam axis, by the same angle as the cutting planes 20, 20', 20" ... of FIG. 3, but in an opposite direction, in order to obtain an element 24' as shown in FIG. 8, similar to the element 24 of FIG. 7 but having a projecting portion 34' that extends from the opposite side of shown digit.

Therefore, according to this invention, from a single drawn or extruded beam 10 can be obtained a practically unlimited set of indicative and/or decorative pieces having different outlines, sizes, perspective effects and thicknesses. Obviously, this invention can be applied not only in the commercial production of indicative pieces and symbols, byt also in the production of decorative and like components.

Moreover various modifications can be made by those skilled in the art, without departing from the spirit and scope of this invention.

I claim:

1. A method for producing a legible sign consisting of a plurality of tridimensional legible graphic symbols such as alphanumeric characters comprising the steps of providing a plurality of elongated members each having a cross-sectional configuration in the form of one of said graphic symbols, there being provided at least one elongated member with a cross-sectional configuration in the form of each one of said graphic symbols, each of said elongated members having a longitudinal axis extending generally perpendicularly to its cross-sectional configuration, cutting said elongated members along planes extending transversely of said respective longitudinal axes to form therefrom said plurality of graphic symbols of which said legible sign consists, and arranging said cut graphic symbols in a predetermined sequence to form said legible sign.

2. A method according to claim 1 wherein said cutting of said elongated members is performed along planes extending obliquely to said longitudinal axis.

3. A method according to claim 1 wherein said cutting of said elongated members is effected along at least one transverse cutting plane which is parallel to at least one next adjacent cutting plane.

4. A method according to claim 1 wherein said cutting of said elongated members is effected along at least one transverse cutting plane which is nonparallel to at least one next adjacent cutting plane.

5. A method according to claim 1 wherein said cutting of said elongated members is effected along a plurality of pairs of parallel planes with each pair of said planes being spaced apart a different distance than each of the other of said pairs of parallel planes whereby said graphic symbols may be formed with different thicknesses.

6. A method according to claim 1 wherein said cutting of said elongated members is effected along transverse cutting planes each extending perpendicularly to said longitudinal axis.

7. A method according to claim 1 wherein each of said elongated members is selected to consist essentially of a drawn metallic body.

8. A method according to claim 1 wherein each of said elongated members is selected to consist essentially of an extruded plastic beam.

9. A method according to claim 1 for producing from a single one of said elongated members a plurality of graphic symbols uniformly comprising said cross-sectional configuration but having different sizes and dimensional ratios, wherein said cutting is performed along a plurality of pairs of adjacent parallel planes, with both of the planes in each of said pair of planes extending obliquely to said longitudinal axis, and with at least two pairs of said plurality of pairs extending at different angles relative to said longitudinal axis whereby similar graphic symbols having different desired sizes and dimensional ratios may be produced.

* * * * *